United States Patent

[11] 3,633,769

[72] Inventors Vladimir Alexandrovich Dubinsky
Brest-Litousky prospekt, 23, kv. 159;
Veniamin Mikhailovich Mats, Tbilissky pereulok, 3a, kv. 21, both of Kiev, U.S.S.R.
[21] Appl. No. 836,508
[22] Filed June 25, 1969
[45] Patented Jan. 11, 1972

[54] STORAGE PREMISES FOR STORING PIECE ARTICLES
3 Claims, 9 Drawing Figs.
[52] U.S. Cl. .................................................. 214/16.4 A
[51] Int. Cl. .................................................. B65g 1/06
[50] Field of Search .......................................... 214/16.4, 16.42, 16.14 B; 198/219

[56] References Cited
UNITED STATES PATENTS

| | | | |
|---|---|---|---|
| 493,542 | 3/1893 | Bessing et al. ............... | 214/16.4 |
| 2,014,351 | 9/1935 | Becker ......................... | 214/16.1 |
| 2,305,212 | 12/1942 | White ........................... | 198/219 |
| 2,722,322 | 11/1955 | Gunderson ................... | 214/16.1 |
| 2,808,157 | 10/1957 | Terril ........................... | 214/38 |
| 3,507,406 | 4/1970 | Zollinger ..................... | 214/16.4 |

*Primary Examiner*—Robert G. Sheridan
*Assistant Examiner*—Raymond B. Johnson
*Attorney*—Waters, Roditi, Schwartz & Nissen

ABSTRACT: Storage premises for storing piece articles, comprising a loading table, an unloading article-delivery table, multilevel and multicell article-storage racks, an article-piling machine cooperating with said storage racks, said machine incorporating a fork catch for handling the articles, the bottom portions of said loading and unloading tables and of said cells of said storage racks being constituted by a plurality of spaced bars, the prongs of said fork catch of the piling machine being adapted to be received in the spaces between said bars.

STORAGE PREMISES FOR STORING PIECE ARTICLES

The present invention relates to storage premises, and, more particularly, it relates to storage premises for storing packaged piece articles.

The present invention can be most successfully used for storing packages with washing. However, it may be used as equally successfully for storing other piece goods, such as boxes with shoes, books tied up into packages, etc.

Known at present are storage premises for storing piece articles, comprising a loading table and an unloading table; multilevel multicell storage racks, an article-piling machine cooperating with these racks and adapted to be moved longitudinally therealong, this machine incorporating a vertically reciprocable carriage mounting a projectable and retractable fork catch, the operation of the premises being controlled by a programming device, the bottom portions of the loading and unloading tables and of the cells of the storage racks being formed by pair of spaced plates adapted to support thereon a container of a pan with packaged articles.

This known type of storage premises is not free from a serious disadvantage arising from the fact that the necessity of using containers or pans involves the additional need of transportation means and storage space for handling and storing these containers or pans, as well as additional expenditure connected with the manufacture and maintenance of such containers or pans.

It is an object of the present invention to overcome this disadvantage.

The present invention has for its object the development of a novel design of storage premises for storing piece articles, without the necessity of using containers or pans.

This object is attained in storage premises for storing piece articles, comprising a loading table and an unloading table, multilevel multicell article-storage racks, an article-piling machine adapted for serving said racks and incorporating a vertically reciprocable carriage mounting a projectable and retractable fork catch, and a programming device in which premises, in accordance with the present invention, the bottom portions of said loading and unloading tables and of said cells of said storage racks are formed by longitudinally spaced bars adapted to receive therebetween the prongs of said fork catch of said article-piling machine, while the article-supporting surfaces of said bars of said loading and unloading tables and of said cells of said racks and said fork catch are made skewed, said bars being so arranged relative to each other that said article-supporting bottom portions sloped toward the centers of the respective article-placing areas; said article-piling machine being provided with a mechanism adapted for precision-stopping said machine.

Storage premises of the above-described design are capable of storing and handling piece articles without the necessity storage, using containers or pans, whereby the design of such premises is simplified, and their maintenance is facilitated.

In a preferred embodiment of the present invention said carriage of said article-piling machine, said cells of said storage, and said loading and unloading table incorporate vertically extending side shields. This feature provides for stability of the articles being stored and handled.

It is also advisable for the mechanism adapted for precision-stopping said article-piling machine to include an electromagnet pivotally connected with a first arm cooperating with another arm mated with a movable stop to which there is secured a cam adapted to operate an electric switch. This structural feature of the machine ensures that the bars of the fork-catch prongs can be accurately received in the spaces between the bars of the storage cells.

The present invention will be better understood from the following detailed description of an embodiment thereof, with due reference to the accompanying drawings, wherein.

Figure 4A:
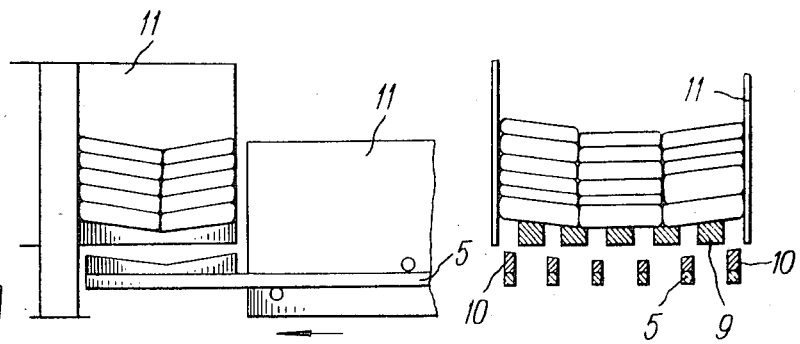
Figure 4B:
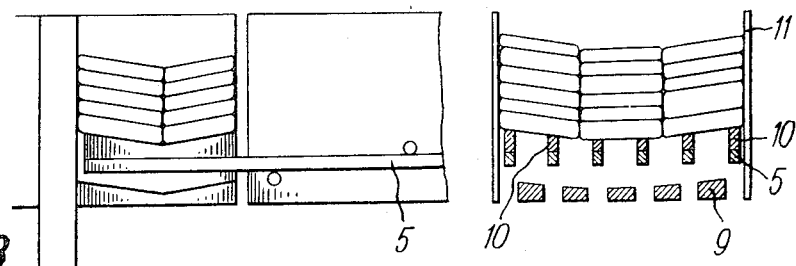
Figure 4C:
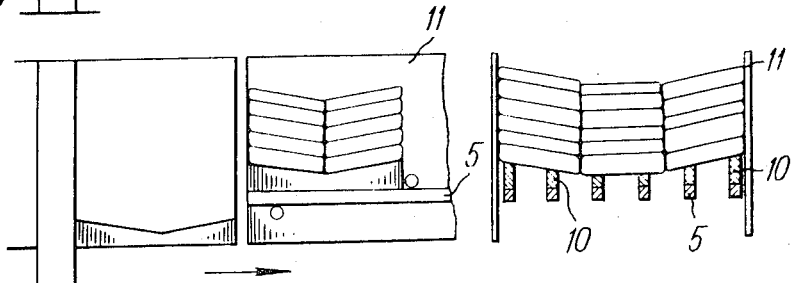
Figure 5A:
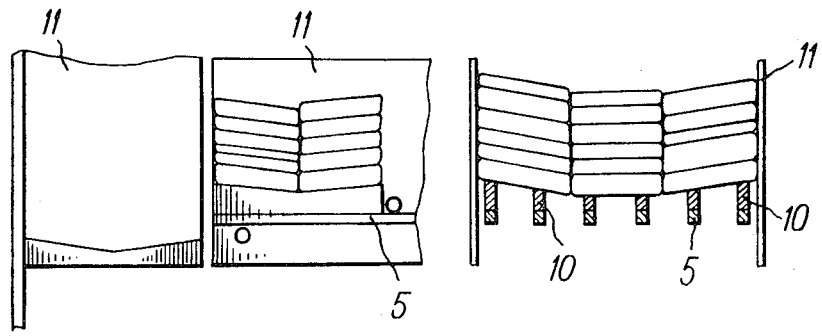
Figure 5B:
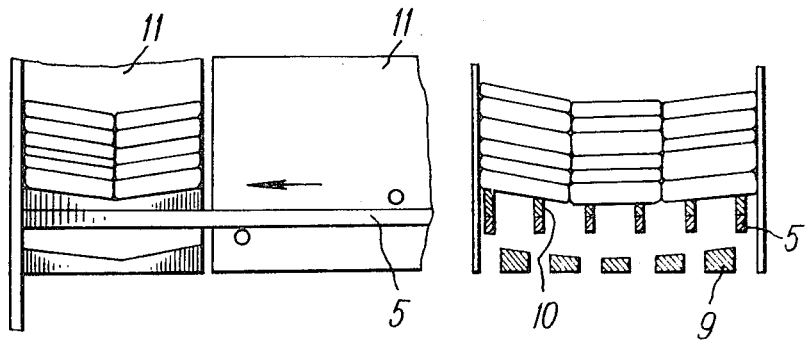
Figure 5C:
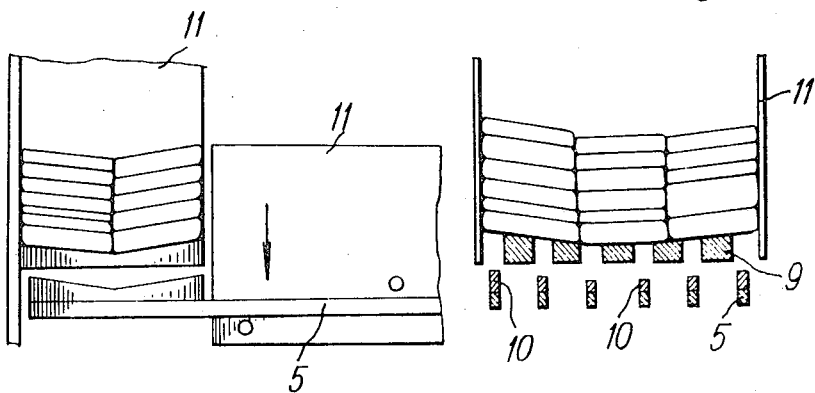

FIG. 4"a," "b," "c" show the successive positions of the bars of the fork-catch prongs during the operation of removing articles from the loading table; and FIG. 5"a," "b," "c" show the successive positions of same bars during the operation of placing articles into a cell of the storage racks.

Figure 1:
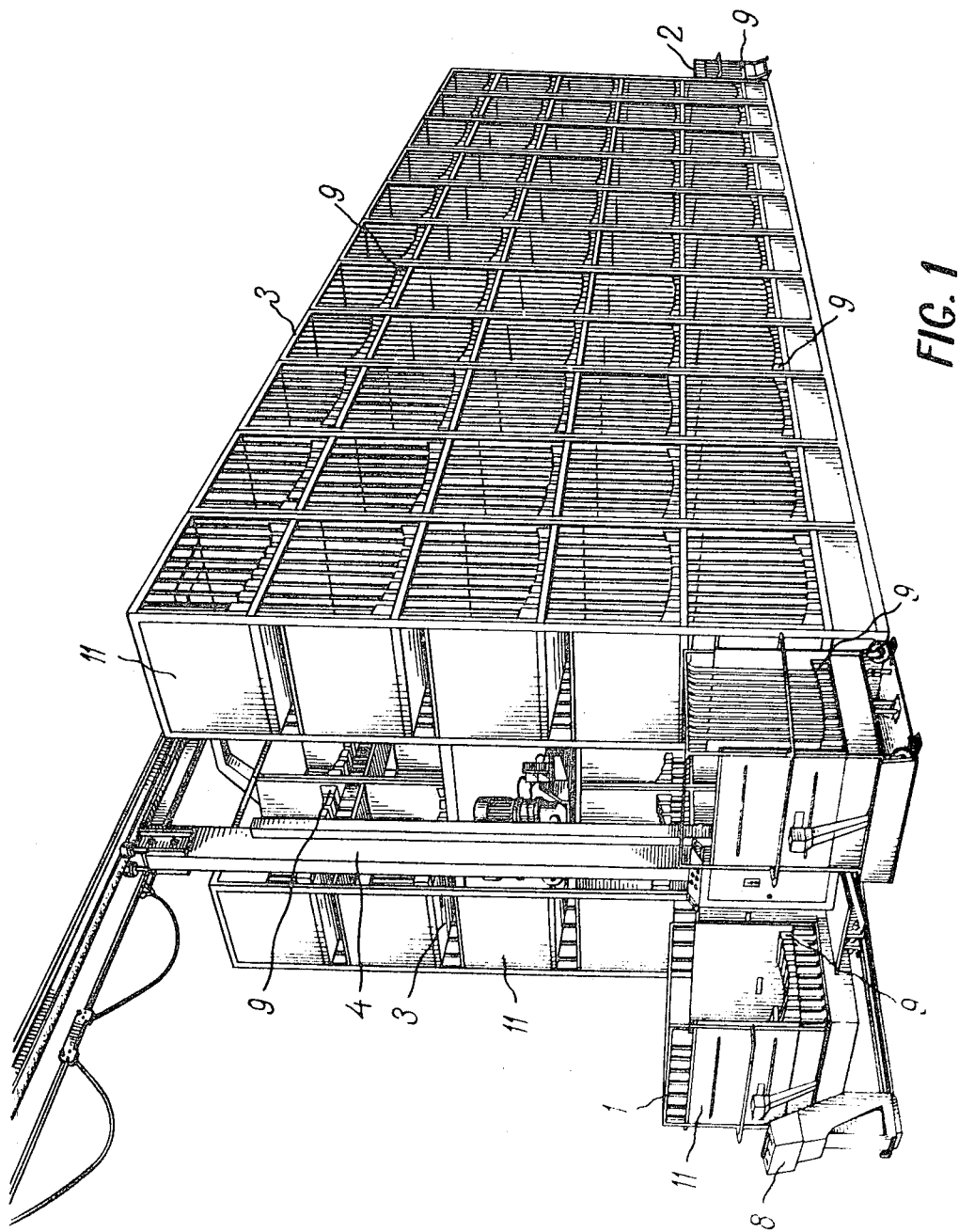
FIG. 1 shows a general view of the storage premises, embodying the invention.
Figure 2:
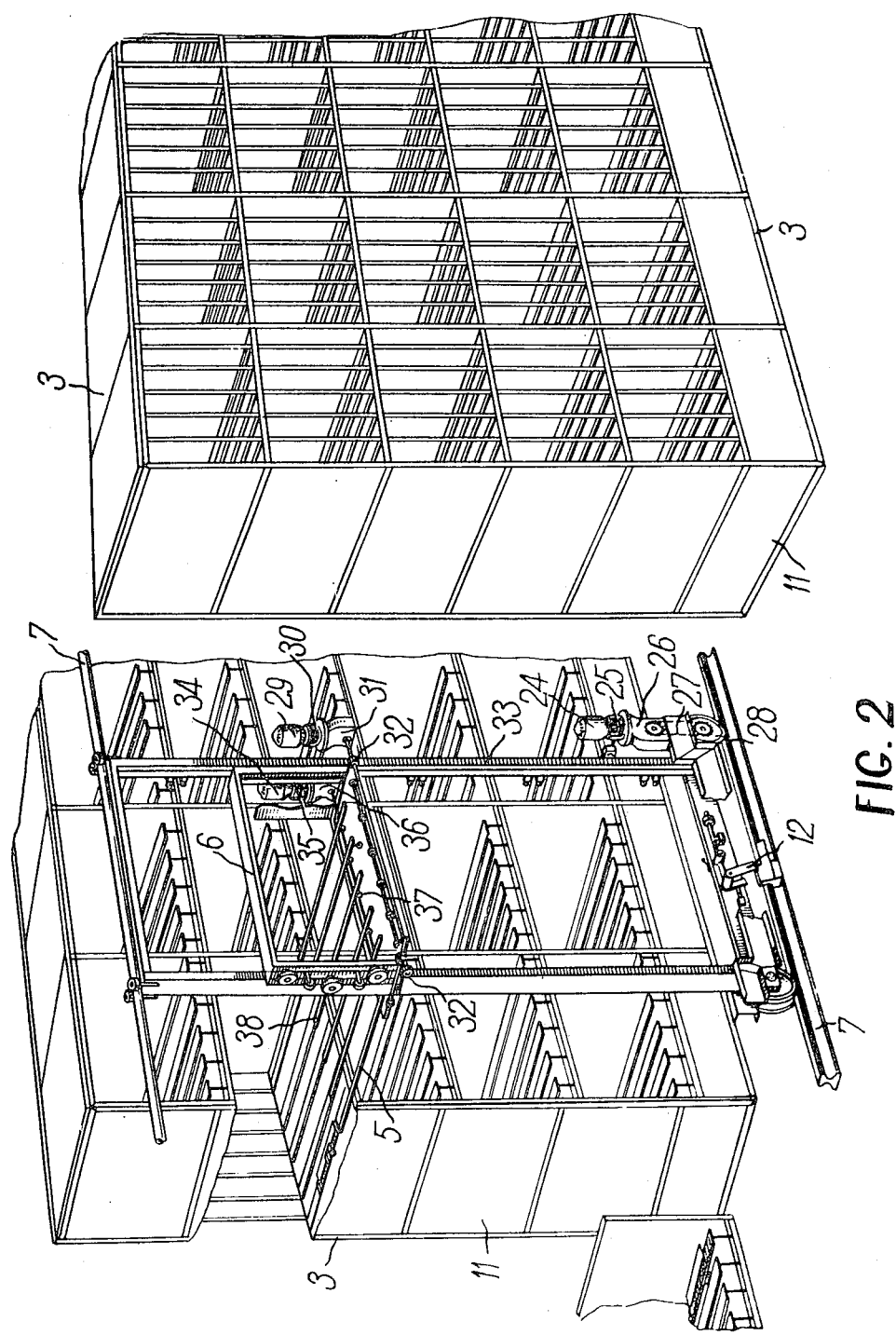
FIG. 2 shows the gearing diagram of the storage premises, embodying the invention.

Referring to the drawings, storage premises for storing piece articles, embodying the invention, comprise loading tables 1 (FIG. 1), unloading table 2, multilevel multicell storage racks 3, an article-piling machine 4 with a projectable fork catch 5 (FIG. 2), a lifting-and-lowering carriage 6 supporting said fork catch; tracks 7 and a programming device 8 (FIG. 1).

The bottom portions of the tables 1, 2 and of the racks 3 are constituted by longitudinally spaced bars 9 having skewed working surfaces. The prongs of the fork catch 5 carry bars 10 (FIGS. 4 and 5), adapted to be received between the adjacent pairs of the bars 9, the bars 10 also having skewed bearing surfaces. The bars 9 and 10 are so arranged in relation to each other, that when the bars are in a cooperating position, their skewed bearing surfaces form together a common supporting surface inclined toward the center of the area of placing the articles, whereby the articles, when placed on the tables 1 and 2, the racks 3 and the fork catch 5 are inclined toward the center of this area, as shown in FIGS. 4 and 5. Side shields 11 are mounted on the tables 1 and 2, the racks 3 and the carriage 6 to ensure stability of the packages during the operation of the storage premises.

Figure 3:
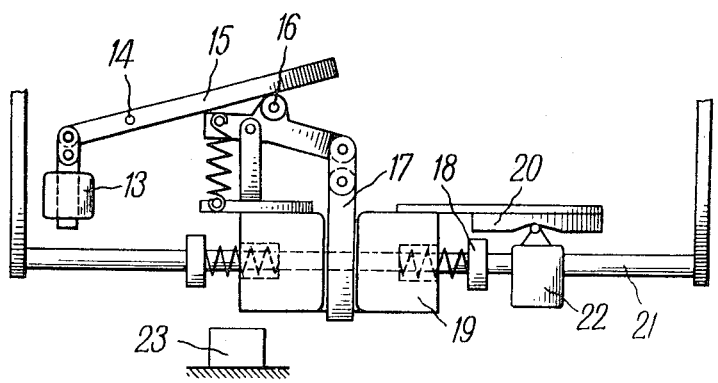
FIG. 3 is a schematic view of a mechanism adapted for precision-stopping the article-piling machine, embodying the invention.

Accurate mating of the bars 10 in relation to the bars 9 of the racks in the course of operation of the article-piling machine 4 is ensured by the incorporating into the latter of a precision-stopping mechanism 12 (FIG. 2) which comprises an electromagnet 13 (FIG. 3), a pivot spindle 14 supporting arm 15, another arm 16 with a pawl 17, an adjustable stop 18, a slide 19 supporting a cam 20, a rod 21, a limit switch 22 mounted for cooperation with the cam 20 and stops 23 mounted at desired locations on the tracks 7 of the storage premises.

The tables 1 and 2 are retained in their operating positions by individual retaining means (not shown).

The piling machine 4 is driven along the tracks 7 by a reversible two-speed electric motor 24 (FIG. 2) cooperating with a brake 25, the driving torque being transmitted from the motor 24 through a worm-reducing gear 26, an endless chain 27 to the driving wheel 28 of the machine.

The carriage 6 is lifted and lowered by another electric motor 29 cooperating with a brake 30, the torque being transmitted through a worm-reducing gear 31 and a pinion 32 meshing with a toothed rack 33. The fork catch 5 is projected toward the tables 1, 2 and racks 3 or retracted therefrom by yet another electric motor 34 cooperating with a brake 35, the torque being transmitted through a worm-reducing gear 36 and pinions 37 meshing with toothed racks 38, the latter being carried by the prongs of the fork catch 5.

The herein described storage premises operate as follows.

Packed articles, e.g. packages of washing are placed onto the supporting surface of the loading table 1. In the course of operation the shields 11 define therebetween a passage, whereby the packages are prevented from being displaced sidewise during transportation.

A punched card, introduced into the programming device 8 is responsible for sending a command from said device for forwarding the packages piled on the loading table 1 into an empty storage cell of the racks 3, and the driving electric motor 24 of the piling machine 4 is energized for rotation in a corresponding direction. The machine 4 moving on the control circuit then switches the two-speed motor 24 to a slower speed; simultaneously, the electromagnet 13 is operated whereby the pawl 17 is projected downward to engage the stop 23. As the pawl 17 engages the stop, their interaction displaces the slide 19 with the cam 20, whereby the limit switch 22 is operated to effect the deenergization of the drive motor 24 and application of the brake 25. As inertia forces move the article-piling machine somewhat further at a very slow speed, the slide 19 compresses a spring associated therewith and engages the rigid stop 18, whereby the machine stops exactly in a desired position opposite the table 1. The carriage 6 is now in its lowered position, and the prongs of the fork catch 5 are above said carriage. The control circuit energizes the motor 34, and the driving torque is transmitted through the worm-reducing gear 36, pinions 37 and toothed racks 38 to project the prongs with the bars 10 into a position below the packages (position "a" in FIG. 4). Then, the carriage-actuating motor 29 is energized, the carriage 6 starts lifting together with the fork catch 5, the bars 10 carried by the prongs lift the packages off the bars 9 of the table 1 (position "b" in FIG. 4), whereafter the prongs are retracted together with the packages into initial position (position "c" in FIG. 4), and the motor 29 is deenergized. The limit switch is operated, the drive motor 24 is energized, and the article-piling machine 4 carries the packages along the racks 3 to a vertical row of cells, determined by the control program, where it is precision stopped in a manner similar to that described above. Then the control circuit energizes the motor 29, and the carriage 6 is lifted to a height corresponding to the level determined by the control program (the above-described stages of operation correspond to the "loading cycle" control program), the motor 29 is deenergized, and the packages are reloaded from the bars 10 of the prongs of the fork catch 5 onto the respective bars 9 of the cell of the racks 3 (position "a," "b," and "c" in FIG. 5). The succession of the steps of this reloading operation is reversed in relation to that described in connection with the operation of taking the packages off the loading table 1.

The "delivery cycle" sequence of operations of the herein-described machine, in the course of which packages are transported from a selected cell onto the delivery tables 2, is similar to that of the "loading " cycle, but the operations are carried out in a reversed succession.

What is claimed is:

1. Storage premises for storing piece articles, said storage premises comprising: a loading table, an unloading table, multilevel and multicell storage-rack means; an article-piling machine adapted for servicing said storage-rack means; a vertically reciprocable carriage mounted on said article-piling machine; a projectable and retractable fork catch carried by said carriage; a first plurality of longitudinally spaced bars forming the article-supporting bars carried by said fork catch and adapted to be received in the spaces between said bars of said first plurality, the bearing surfaces of said first and said second plurality of bars being skewed and said bars being so arranged relative to each other that said bearing surfaces of said cells and said tables slope toward the centers of the respective article-placing areas; means carried by said article-piling machine and adapted for precision-stopping said machine, whereby said second plurality of bars can be received between the respective bars of said first plurality of bars; and a programming device for operating said storage premises.

2. Storage premises for storing piece articles, according to claim 1, wherein said carriage of said article-piling machine, said loading and unloading tables, and said cells of said rack means all incorporate vertically extending side shields.

3. Storage premises for storing piece articles, according to claim 1, wherein said means adapted for precision-stopping said article-piling machine comprises an electromagnet pivotally connected with a first arm, said first arm cooperating through a second arm with a pawl, said pawl being associated with a slide carrying a cam adapted to operate a limit switch.

* * * * *